(12) United States Patent
Egenter et al.

(10) Patent No.: US 12,374,923 B2
(45) Date of Patent: Jul. 29, 2025

(54) METHOD OF OPERATING AN APPARATUS FOR WIRELESSLY TRANSMITTING ELECTRICAL POWER IN THE DIRECTION OF AN ELECTRICAL CONSUMER AND SYSTEM

(71) Applicant: E.G.O. Elektro-Gerätebau GmbH, Oberderdingen (DE)

(72) Inventors: Christian Egenter, Bretten (DE); Ralf Pawlowitsch, Bretten (DE); Ulrich Wächter, Bruchsal (DE); Jan Draak, Eindhoven (NL); Klaas Lulofs, Veldhoven (NL)

(73) Assignee: E.G.O. Elektro-Gerätebau GmbH, Oberderdingen (DE)

( * ) Notice: Subject to any disclaimer, the term of this patent is extended or adjusted under 35 U.S.C. 154(b) by 0 days.

(21) Appl. No.: 18/441,047

(22) Filed: Feb. 14, 2024

(65) Prior Publication Data

US 2024/0333035 A1 Oct. 3, 2024

(30) Foreign Application Priority Data

Apr. 3, 2023 (EP) .................................... 23166371

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC ............ H02J 50/12; H02J 50/80; H02J 50/10; H02M 7/4815; H02M 7/5395; G01R 23/02
See application file for complete search history.

(56) References Cited

U.S. PATENT DOCUMENTS

| 6,184,651 B1* | 2/2001 | Fernandez | .............. H02J 50/80 320/108 |
| 8,981,598 B2* | 3/2015 | Azancot | .................. H02J 50/12 307/104 |

(Continued)

FOREIGN PATENT DOCUMENTS

WO WO 2014/057343 A1 4/2014

OTHER PUBLICATIONS

European Patent Office, Extended European Search Report received for Application No. 23166371.7, dated Oct. 16, 2023, 11 pages, Germany.

*Primary Examiner* — Jared Fureman
*Assistant Examiner* — Michael J Warmflash
(74) *Attorney, Agent, or Firm* — ALSTON & BIRD LLP

(57) ABSTRACT

Method of operating an apparatus for wirelessly transmitting electrical power in the direction of an electrical consumer by means of inductive coupling, wherein the apparatus comprises:
  a rectifier for generating a DC Voltage based on an alternating mains voltage,
  an inverter being supplied by the DC voltage, the inverter being adapted to generate a pulse width modulated control signal, and
  a transmitter coil being supplied with the pulse width modulated control signal, wherein the transmitter coil is adapted to generate an alternating magnetic field being used to wirelessly transmit the electrical power in the direction of the electrical consumer,
the method comprising the steps:
  determining a first characteristic frequency $f_{o\_1}$ of an oscillating circuit comprising the transmitter coil, while the electrical consumer is not inductively coupled to the transmitter coil, (Continued)

Figure 1:
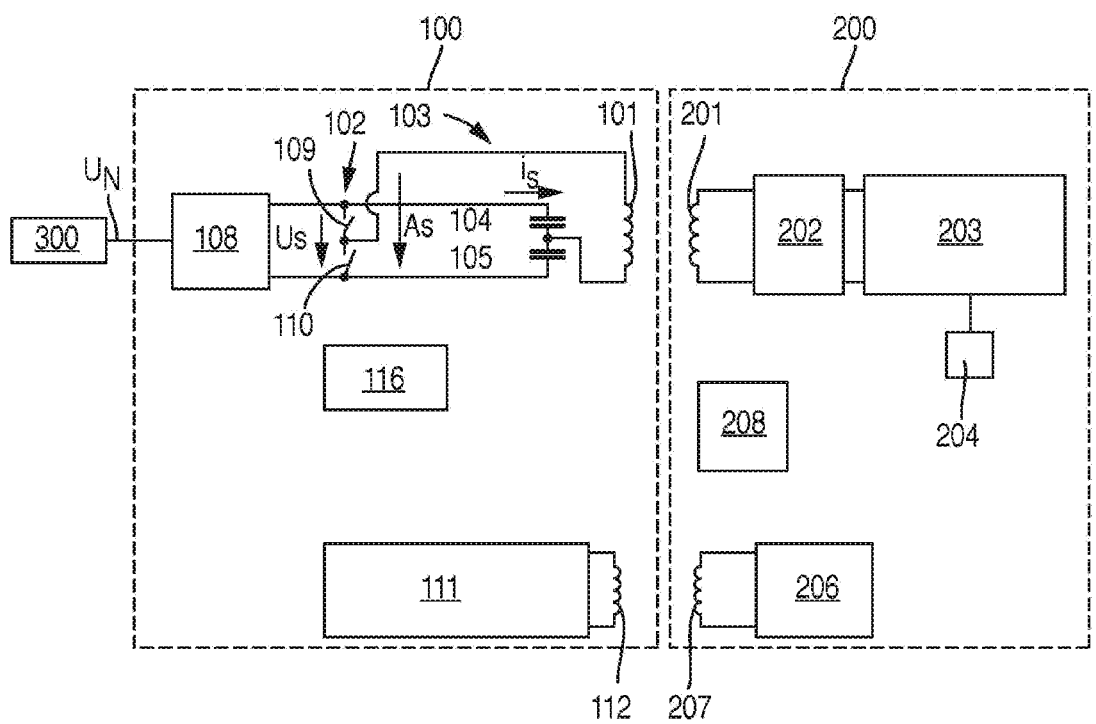
Figure 1:
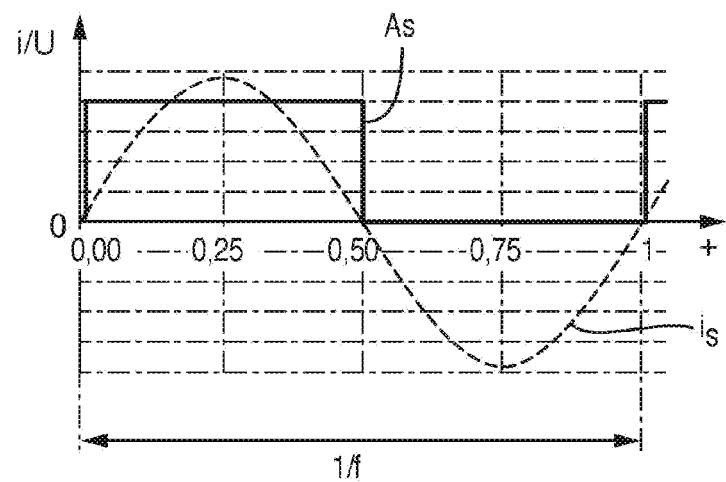

determining a second characteristic frequency $f_{0\_2}$ of the oscillating circuit comprising the transmitter coil, while the electrical consumer is inductively coupled to the transmitter coil and an electrical load of the electrical consumer is deactivated, and operating the apparatus depending on a frequency difference $\Delta f_c = f_{0\_1} - f_{0\_2}$.

12 Claims, 3 Drawing Sheets

(56) References Cited

U.S. PATENT DOCUMENTS

| | | | | |
|---|---|---|---|---|
| 11,177,699 | B2* | 11/2021 | Muurinen | H02J 50/12 |
| 11,509,131 | B2* | 11/2022 | Pifferi | H02J 50/10 |
| 2008/0197802 | A1* | 8/2008 | Onishi | H02J 50/60 |
| | | | | 320/108 |
| 2009/0079269 | A1* | 3/2009 | Jin | H02J 50/70 |
| | | | | 307/104 |
| 2010/0171369 | A1* | 7/2010 | Baarman | H04B 5/72 |
| | | | | 307/104 |
| 2022/0416844 | A1* | 12/2022 | Azancot | H02J 50/10 |

* cited by examiner

METHOD OF OPERATING AN APPARATUS FOR WIRELESSLY TRANSMITTING ELECTRICAL POWER IN THE DIRECTION OF AN ELECTRICAL CONSUMER AND SYSTEM

CROSS-REFERENCE TO RELATED APPLICATIONS

This application claims priority to European Application No. 23166371.7, filed Apr. 3, 2023, the contents of which are hereby incorporated herein in its entirety by reference.

The invention is based on the object of providing a method for operating an apparatus for wirelessly transferring electrical energy or power in the direction of an electrical consumer by means of inductive coupling and a corresponding system which enable operation that is as reliable and flexible as possible.

The method serves for operating an apparatus for wirelessly transferring electrical energy or power in the direction of an electrical consumer by means of inductive coupling, also referred to as Wireless Power Transfer, WPT. The method may also serve for operating a system comprising the apparatus and the electrical consumer. With regard to the principles concerning WPT, reference should also be made to the relevant technical literature. Preferably, the apparatus is operated in accordance with the WPC (Wireless Power Consortium) Ki (Cordless Kitchen) method.

The apparatus for wirelessly transferring energy in the direction of an electrical consumer by means of inductive coupling can also be referred to as a transmitter, and the electrical consumer can be referred to as a receiver or wireless appliance.

The apparatus comprises a conventional single-phase or polyphase rectifier for generating a DC voltage from an in particular sinusoidal power supply system voltage or alternating mains voltage.

The apparatus comprises an inverter fed from the DC voltage. The inverter can be for example a half-bridge inverter or a full-bridge inverter. The inverter is configured to generate a pulse-width-modulated control or drive signal, in particular in the form of a pulse-width-modulated control voltage.

The apparatus comprises a conventional transmitter coil being supplied with the pulse width modulated control signal. The transmitter coil is adapted to generate an alternating magnetic field based on the pulse width modulated control signal, wherein the alternating magnetic field is used to wirelessly transmit the power in the direction of the electrical consumer.

The method comprises the following steps: determining a first characteristic frequency f0_1 of an oscillating circuit comprising the transmitter coil, while the electrical consumer is not inductively coupled to the transmitter coil, determining a second characteristic frequency f0_2 of the oscillating circuit comprising the transmitter coil, while the electrical consumer is inductively coupled to the transmitter coil and an electrical load of the electrical consumer is deactivated or decoupled, and operating the apparatus depending on a frequency difference $\Delta fc = f0\_1 - f0\_2$. The electrical load of the electrical consumer is typically activated/deactivated by means of electrical switching means, e.g. in form of semiconductor switches, relays, etc. The electrical load may e.g. be embodied as an electrical heating element, an electric motor, etc. The electrical load does in particular not include typical low power supplies or small electrical loads of the receiver, e.g. for a user interface or further auxiliary functions of the receiver, as these loads are typically high ohmic loads, which do not relevantly effect the transfer function.

According to an embodiment, the method comprises the step: determining a third characteristic frequency f0_3 of the oscillating circuit comprising the transmitter coil, while the electrical consumer is inductively coupled to the transmitter coil and the electrical load of the electrical consumer is activated, and operating the apparatus depending on a frequency $fcalc = f0\_3 + \Delta fc$.

According to an embodiment, the method comprises the step: estimating a characteristic of a transfer function P(f) depending on the frequency fcalc and depending on design parameters of the electrical consumer. The transfer function P(f) specifies or denotes an electrical power transmittable by the apparatus depending on an operating frequency of the apparatus. The design parameters of the electrical consumer specify electrical and/or mechanical properties of the electrical consumer.

The design parameters of the electrical consumer may e.g. be or include a receiver load quality factor:

$$Q\_PRx = \frac{2\pi f_s L_s}{R_L}$$

wherein $f_S$ is a resonant frequency of a receiver oscillating circuit of the electrical consumer, $L_S$ is an inductance of the receiver oscillating circuit, and $R_L$ is a resistance of the receiver oscillating circuit.

According to an embodiment, the characteristic of the transfer function P(f) specifies or denotes if the transfer function P(f) has one peak or two peaks.

According to an embodiment, the method comprises the step: setting a frequency and/or a duty cycle of the pulse width modulated control signal for transmitting power depending on the characteristic of the transfer function P(f).

According to an embodiment, the method comprises the step: determining an impedance at the third characteristic frequency f0_3, wherein the frequency and/or the duty cycle of the pulse width modulated control signal is set for the transmission of power depending on the impedance at the third characteristic frequency f0_3.

According to an embodiment, the frequency of the pulse width modulated control signal is set in a frequency range of the third characteristic frequency f0_3 or in the frequency range higher than a frequency of a second peak of the transfer function P(f) depending on an impedance at the third characteristic frequency f0_3.

According to an embodiment, the first characteristic frequency f0_1, the second characteristic frequency f0_2 and the third characteristic frequency f0_3 are determined as the frequency for which a current flowing in the oscillating circuit is in phase with the pulse width modulated control signal.

According to an embodiment, the first characteristic frequency f0_1, the second characteristic frequency f0_2 and the third characteristic frequency f0_3 are determined as the frequency for which compared to other frequencies a maximum current is flowing in the oscillating circuit. The first characteristic frequency f0_1, the second characteristic frequency f0_2 and the third characteristic frequency f0_3 may e.g. be the respective resonant frequency of the oscillating circuit under the respective coupling condition.

According to an embodiment, the step of determining the first characteristic frequency f0_1, the step of determining the second characteristic frequency f0_2 and the step of determining the third characteristic frequency f0_3 is performed while a level of the DC Voltage is below 120 V, in particular below 30 V.

According to an embodiment, the method comprises the step: applying a stimulus signal having a predetermined frequency spectrum to the oscillating circuit. The stimulus signal may e.g. be formed as a short voltage pulse having a wide and approximately constant frequency spectrum over a given frequency range. At the first characteristic frequency f0_1, at the second characteristic frequency f0_2 and at the third characteristic frequency f0_3 a frequency spectrum of the resulting current flowing in the oscillating circuit has its maximum value. The frequency spectrum may e.g. be determined by a FFT analysis of the current flowing in the oscillating circuit or in the coil.

The system comprises an apparatus for wirelessly transmitting electrical power in the direction of an electrical consumer by means of inductive coupling, the apparatus comprising: a rectifier for generating a DC Voltage based on an alternating mains voltage, an inverter being supplied by the DC voltage, the inverter being adapted to generate a pulse width modulated control signal, and a transmitter coil being supplied with the pulse width modulated control signal. The transmitter coil is adapted to generate an alternating magnetic field being used to wirelessly transmit the electrical power in the direction of the electrical consumer. The system further comprises an electrical consumer. The apparatus and the electrical consumer are respectively adapted to perform a method according to one of the preceding claims.

The invention is suitable for Ki Wireless Power for Kitchen appliances. Provided is e.g. a method for power control identifying suitable operating parameters to drive the inverter when starting transmitting power or in case of changing power setpoints. Electrical and/or mechanical design parameters from the electrical consumer or receiver may be communicated to the apparatus.

According to the invention, the frequency difference Δfc=f0_1−f0_2 considers the frequency shift caused by magnetic coupling effects of the electrical consumer placed in proximity of the transmitter coil effecting the transmitter resonance frequency and the transfer function P(f) of power towards the electrical consumer. The frequency difference Δfc is used to determine adequate operating parameters of an (operating) frequency f_op and an (operating) duty cycle (pulse duty factor) to start power transfer and/or to adjust power after a requested change in the electrical power to be transmitted.

According to the invention, a characteristic frequency is measured under various conditions which are at least (1) without presence of any electrical consumer or other objects above the transmitter coil, (2) the electrical consumer placed above the transmitter coil with disconnected electrical load, and (3) the electrical consumer placed above the transmitter coil with connected electrical load.

The measurement (1) without receiver can be done as calibration during the manufacturing or after the apparatus is placed in operation. The measurement (1) can e.g. be performed when some surface detection method determines that no electric or magnetic object is placed on the transmitter surface.

To determine or measure the characteristic frequencies for the conditions (1) to (3) the inverter or converter may be driven with a phase angle close to 0° between a current through the transmitter coil and the pulse width modulated control signal generated by the inverter. A PLL may be used to force the current through the transmitter coil to be in phase with the pulse width modulated control signal generated by the inverter. Alternatively, or additionally, to determine or measure the characteristic frequencies for the conditions (1) to (3), a frequency sweep may be performed to find the characteristic frequency causing a peak current through the transmitter coil. The measurement of the characteristic frequencies for the conditions (1) to (3) may be performed at a low DC voltage around zero crossing of the alternating mains voltage.

Then, the frequency difference Δfc=f0_1−f0_2 is calculated as a compensation factor.

The specific frequency fcalc=f0_3+Δfc together with design parameters of the electrical consumer, which are e.g. communicated from the electrical consumer to the apparatus after placement of the electrical consumer at a dedicated position, are used to estimate characteristics of the transfer function in form of a coupling factor, in form of if the transfer function has one or two peaks, and in form of a frequency f1 of the second peak, if any.

A current and/or an impedance at the frequency f0_3 may be measured. Based on the current and/or the impedance at the frequency f0_3 and a desired power level to be transmitted, i.e. a power level setpoint, in conjunction with the estimated characteristic of the transfer function it can be decided to set an operating frequency at/near the first resonance frequency or second peak frequency, if any. Further, based on the current and/or the impedance at the frequency f0_3 and the desired power level to be transmitted in conjunction with the estimated characteristics of the transfer function a start (operating) frequency f_op and a start duty cycle DC_op for the desired power level to be transmitted may be calculated.

The invention proposes to measure at least 3 times a characteristic (resonance) frequency under variable conditions, to combine the measurement results with information on the design of the electrical consumer received e.g. in start-up messages of the electrical consumer in order to achieve a good approximation of relevant points of the actual transfer function and to decide on adequate operating points to start the power transfer.

The measurements of the first and of the second characteristic frequency f0_1 and f0_2 allow to compensate effects from receiver ferrites (flux concentrator) to the transmitter coil. The measurement of the third characteristic frequency f0_3 denotes the characteristic resonance frequency. The frequency fcalc=f0_3+Δfc is used to determine relevant characteristics of the transfer function.

The frequency fcalc indicates if the transfer function has double peaks (f0 and f1) or a single peak (f0) as fcalc includes information on actual coupling. Further, the frequency fcalc gives an approximation for a second resonance f1 at a higher frequency.

$$Q\_PRx = \frac{2\pi f_s L_s}{R_L}$$

may be calculated from data received by the electrical consumer and allows adjustment of measured f0_3. Further, Q_PRx indicates an achievable power at f1.

The current (and voltage) may be measured during the measurement of the characteristic frequencies, so that impedance Z(f0_3) can be calculated. The impedance Z(f0_3) determines the transmittable power P(f0_3) based on a duty cycle of 50%. First P(f0_3) may be used together with P(f1) to take decision whether an operating frequency fop for a desired power level to be transmitted is in the frequency range of f0_3 or in the frequency range of f1. Further, the impedance Z(f0_3) allows to estimate a start duty cycle as a reasonable share considering the desired power level to be transmitted and P(f0_3) and P(f1).

According to the invention, the cross effect between the transmitter and the receiver caused by the proximity of their ferrites is determined. The transmitter inductivity is increased by the receiver ferrites if they are in the operating volume of the transmitter magnetic field. The same effect occurs in the opposite direction as the receiver inductivity increases caused by the proximity of the transmitter ferrites. This cross effect shifts the effective transfer function towards lower frequencies. The cross effect is affected by distance, misalignment, size and position of ferrites and the transfer function may be effected significantly. First, the peak frequencies are shifted, wherein some high power transfer towards the receiver is possible. Additionally, coupling and the characteristic of the transfer function may change from single to double peak characteristic. The invention enables to determine the cross effect caused by the receiver ferrites onto the transmitter inductivity. The determined cross effect together with known parameters on the electrical design of the receiver allow to conclude onto the effective coupling between transmitter and receiver coils, the existence of a second resonance peak of the transfer function and some good estimation on its frequency f1. The invention offers a decision criteria for determining some preferable starting frequency for operation in order to guarantee fast and effective settling to a desired power level.

Figure 2A:
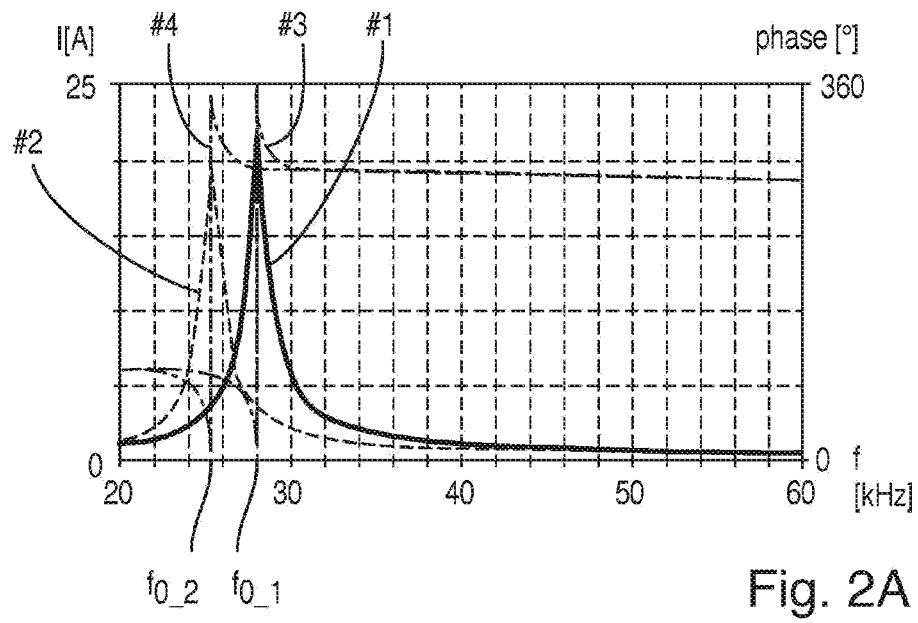
Figure 2B:
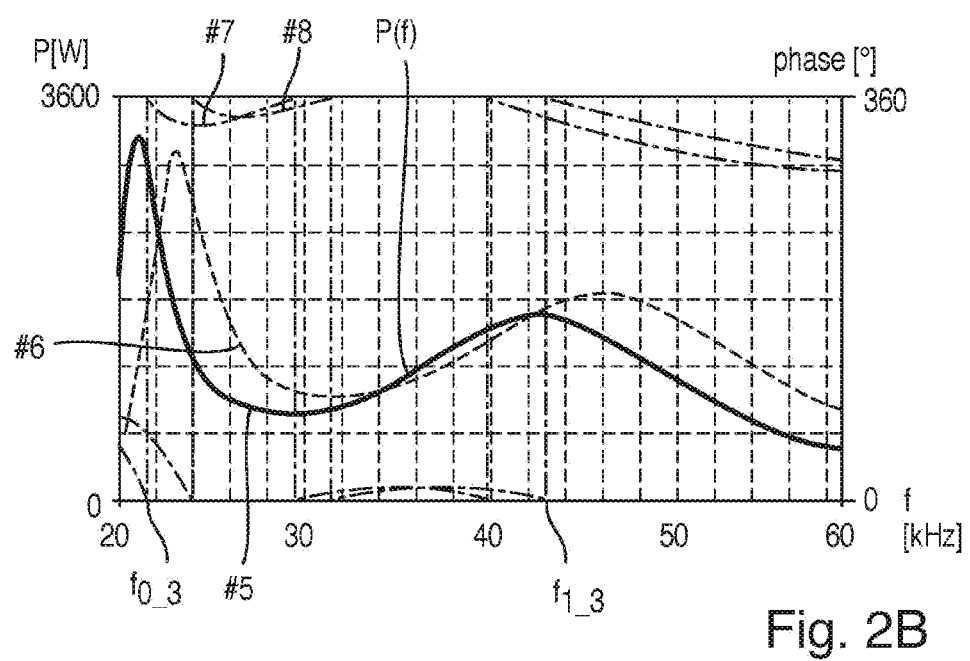
Figure 3:
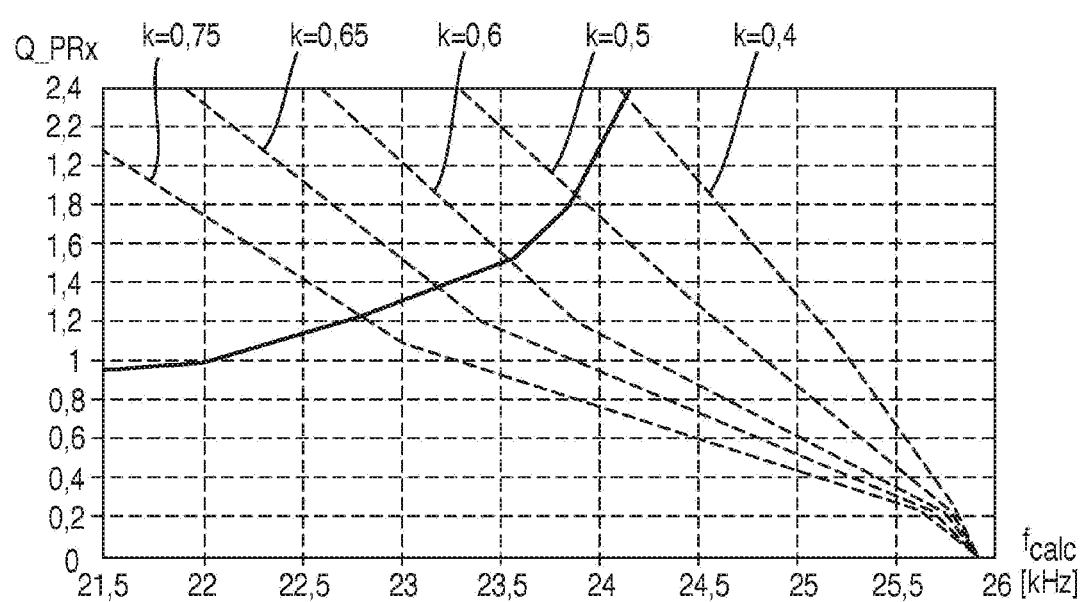

The invention is described in detail hereinafter with reference to the drawings. In the figures:

FIG. 1 shows a block diagram of a system comprising an apparatus for wirelessly transmitting electrical power in the direction of an electrical consumer by means of inductive coupling and the electrical consumer, FIG. 2a shows a first curve depicting a current flowing in a transmitter coil of the apparatus depending on the frequency while the electrical consumer is not inductively coupled to the transmitter coil, and shows a second curve depicting a current flowing in the transmitter coil of the apparatus depending on the frequency while the electrical consumer is inductively coupled to the transmitter coil and an electrical load of the electrical consumer is deactivated, FIG. 2b shows transfer functions P(f) specifying an electrical power transmittable by the apparatus towards the electrical consumer depending on a frequency while the electrical consumer is inductively coupled to the transmitter coil and the electrical load of the electrical consumer is activated, and FIG. 3 shows a set of curves specifying a receiver load quality factor Q_PRx depending on a specific frequency fcalc for different coupling factors between the apparatus and the electrical consumer.

FIG. 1 shows a block diagram of a system 1000 comprising an apparatus 100 for wirelessly transmitting electrical power in the direction of an electrical consumer 200 by means of inductive coupling and the electrical consumer 200.

The apparatus 100 comprises a rectifier 108 for generating a DC voltage US from a conventional grid voltage UN of an AC voltage grid 300.

The apparatus 100 furthermore comprises an inverter 102 fed from the DC voltage US comprising switching means 109 and 110, which is designed to generate a pulse-width-modulated control signal AS having an adjustable frequency f and an adjustable duty cycle.

The apparatus 100 further comprises capacitors 104, 105, which are connected in series between output terminals of the rectifier 108 or the DC voltage US, respectively.

The apparatus 100 further comprises a transmitter coil 101 being supplied with the pulse width modulated control signal AS, wherein the capacitors 104, 105 and the transmitter coil 101 are interconnected in such a way that they form a resonant circuit 103. For this purpose, one terminal of the transmitter coil 101 is electrically connected to a connecting node of the semiconductor switching means 109, 110 of the inverter 102 and another terminal of the transmitter coil 101 is connected to a connecting node of the capacitors 104, 105.

It is apparent that the illustrated inverter and resonant circuit topology is solely exemplary. For example, an inverter having a full bridge can be used in the scope of the present invention, differently interconnected series or parallel resonant circuits can be used, etc.

A magnetic alternating field for transferring the energy is generated by means of the transmitter coil 101.

The apparatus 100 further comprises a communication unit 111, which is coupled to a communication coil 112 of the apparatus 100. The communication unit 111 in conjunction with the communication coil 112 is used for bidirectional data exchange with the electrical consumer 200. In particular, design parameters of the electrical consumer 200 are communicated to the apparatus 100 by means of the bidirectional data exchange.

The apparatus 100 further comprises a control unit 116, which is designed to control a power transmitted by the inverter 102 to a predeterminable setpoint value, wherein a frequency f and/or a duty cycle of the control signal AS is/are used as manipulated variable.

The electrical consumer 200 comprises a receiving coil 201 having ferrites and a passive LC resonant circuit 202 connected down-stream.

The electrical consumer 200 further comprises a switching unit 203 for activating or deactivating an electrical load 204, i.e. connecting or disconnecting the electrical load 204 to the passive LC resonant circuit 202. The electrical load 204 of the electrical consumer 200 is shown by way of example as an electrical load which can be activated or deactivated, i.e. switched on or off. The electrical load 204 may also include a rectifier and means for voltage averaging to drive motor loads, etc.

The electrical consumer 200 further comprises a communication unit 206, which is coupled to a communication coil 207. The communication unit 206 in conjunction with the communication coil 207 is used for bidirectional data exchange with the apparatus 100.

The electrical consumer 200 further comprises a control unit 208, which controls the operation of the electrical consumer 200. The control unit 208 has a data connection to the switching unit 203 and to the communication unit 206. The control unit 208 controls, inter alia, the activating or deactivating of the electrical load 204 by suitable actuation of the switching unit 203 and communication with the apparatus 100.

FIG. 2a shows a first curve #1 depicting a current is flowing in the transmitter coil 101 depending on the frequency f while the electrical consumer 200 is not inductively coupled to the transmitter coil 101. FIG. 2a further shows a second curve #2 depicting the current is flowing in the transmitter coil 101 depending on the frequency f while the electrical consumer 200 is inductively coupled to the transmitter coil 101 and the electrical load 204 of the electrical consumer 200 is deactivated. FIG. 2a further shows a third curve #3 depicting a phase angle between the current is flowing in the transmitter coil 101 and the pulse-width-modulated control signal AS while the electrical consumer 200 is not inductively coupled to the transmitter coil 101. FIG. 2a further shows a fourth curve #4 depicting a phase angle between the current is flowing in the transmitter coil 101 and the pulse-width-modulated control signal AS while the electrical consumer 200 is inductively coupled to the transmitter coil 101 and the electrical load 204 of the electrical consumer 200 is deactivated. The phase angles are scaled between 0° and 360°, so that phase zero crossing can be easily shown as a big step from 0° to 360°.

As depicted, at a first characteristic frequency $f0\_1$ a maximum current is flowing in the the transmitter coil 101 or oscillating circuit 103 while the electrical consumer 200 is not inductively coupled to the transmitter coil 101. At a second characteristic frequency $f0\_2$ a maximum current is flowing in the transmitter coil 101 or oscillating circuit 103 while the electrical consumer 200 is inductively coupled to the transmitter coil 101 and the electrical load 204 of the electrical consumer 200 is deactivated. As depicted, at the first characteristic frequency $f0\_1$ and at the second characteristic frequency $f0\_2$ the current is in phase with the pulse-width-modulated control signal AS.

For all curves #1 to #4 the receiver impedance is infinite while the electrical consumer 200 is not inductively coupled to the transmitter coil 101 or at least highly resistive while the electrical consumer 200 is inductively coupled to the transmitter coil 101 and the electrical load 204 of the electrical consumer 200 is deactivated, such that no (or at least very low) currents flow through the receiver coil 201. Nevertheless, while the electrical consumer 200 is inductively coupled to the transmitter coil 101 the receiver ferrites effect the transmitter inductivity and thus the characteristic frequency $f0\_2$ is lower than the characteristic frequency $f0\_1$.

FIG. 2b shows transfer functions P(f) #5 und #6 specifying an electrical power transmittable by the apparatus 100 towards the electrical consumer 200 depending on a frequency f while the electrical consumer 200 is inductively coupled to the transmitter coil 101 and the electrical load 204 of the electrical consumer 200 is activated. Additionally, the curves #7 and #8 depict a corresponding phase angle between the current is flowing in the transmitter coil 101 and the pulse-width-modulated control signal AS. The identical receiver or electrical consumer 200 is used for both curves #5 and #6, but curve #5 shows the real or measured transfer function P(f) considering the cross effect between the apparatus 100 and the electrical consumer 200, wherein curve #6 is calculated without the cross effect, meaning that the inductivity values of the apparatus 100 and of the electrical consumer 200 are used in the calculation without considering the coupling effects between the apparatus 100 and the electrical consumer 200.

The inductivity values of the coils 101 and 201 are known. Nevertheless, the effective inductivity values are unknown as the cross effect between the coils 101 and 201 occurs only in proximity and may vary significantly with distance, alignment and further geometric or design parameters for different operating conditions.

The shift in resonance frequency between the curves #5 and #6 corresponds to the shift in resonance frequency between the curves #1 and #2, because the dominant effect on the lower resonance frequency f0 is caused by the transmitter inductivity, while the higher resonance frequency f1 is more affected by the opposite cross effect from transmitter ferrites onto the receiver inductivity in relevant manner as well.

As depicted, the transfer function #5 has a third characteristic frequency $f0\_3$ and a further specific frequency $f1\_3$. At the third characteristic frequency $f0\_3$ and at the frequency $f1\_3$ the current is in phase with the pulse-width-modulated control signal AS.

According to the invention, the characteristic frequencies $f0\_1$, $f0\_2$ and $f0\_3$ are measured. To measure the frequencies $f0\_1$, $f0\_2$ and $f0\_3$, a Phase Locked Loop (PLL) may be used to force the current is flowing in the oscillating circuit 103 or in the transmitter coil 101 to be in phase with the pulse width modulated control signal AS. According to timing delays, in practical the voltage step As may have a short delay after the determined current is zero crossing. The resulting locking frequency is then determined to be the frequency $f0\_1$, $f0\_2$ or $f0\_3$, respectively. The frequencies $f0\_1$, $f0\_2$ and $f0\_3$ may also be measured by means of a frequency sweep, wherein at the first characteristic frequency $f0\_1$, the second characteristic frequency $f0\_2$ and the third characteristic frequency $f0\_3$ a maximum current is flowing in the oscillating circuit 103. The step of determining the first characteristic frequency $f0\_1$, the step of determining the second characteristic frequency $f0\_2$ and the step of determining the third characteristic frequency $f0\_3$ may be performed during a level of the DC Voltage US e.g. below 30 V.

Then, a specific frequency $fcalc=f0\_3+\Delta fc$ is calculated, wherein $\Delta fc=f0\_1-f0\_2$.

Design parameters as the receiver load quality factor Q_PRx or the necessary values to calculate the receiver load quality factor Q_PRx may be communicated to the apparatus 100 from the electrical consumer 200.

Reference is now made to FIG. 3. FIG. 3 shows a set of curves specifying a receiver load quality factor Q_PRx on the Y-axis depending on the specific frequency fcalc on the X-axis for different coupling factors k between the apparatus 100 and the electrical consumer 200.

Q_PRx is calculated based on electrical parameters communicated by the electrical consumer 200 to the apparatus 100 e.g. before operation. The frequency fcalc is determined as described above. The actual coupling can be determined using FIG. 3, which is e.g. calculated or measured during a development phase of the apparatus 100. If $f0\_3$ instead of $fcalc=f0\_3+\Delta fc$ would be used to calculate the relevant operating parameters, the curves depicted in FIG. 3 would have large tolerances due to the varying cross effect in various coupling situations.

FIG. 3 further depicts a border line between an upper area, where transfer functions P(f) having a double peak characteristic are located, and a lower area, where transfer functions P(f) having a single peak characteristic are located. The frequency distance between the two peaks decreases for transfer functions close to the border line, so that these transfer functions have a wider frequency range with nearly no change on the transferred power.

In practical, the coupling analysis runs inverse, meaning Q_PRx is calculated based on electrical parameters communicated by the receiver 200 to the transmitter 100 before operation. The frequency fcalc is determined according to the described method, then the actual coupling can be looked up using FIG. 3, which was created and implemented during development phase of the transmitter 100.

In order to explain the outcome of FIG. 3, an electrical consumer 200 having a Q_PRx of 1.6 is assessed for various determined fcalc. If fcalc equals 24.8 kHz, then the coupling factor k between the apparatus 100 and the electrical consumer 200 is approximately 0, 4 and the resulting transfer function has a single peak. If instead fcalc equals e.g. to 22.3 kHz for the same Q_PRx of 1.6, the coupling factor k is approximately 0, 75 and the transfer function has two peaks. If fcalc is determined around 23.6 kHz, then the transfer function has some bigger frequency range with approximately constant power.

Further, an impedance at the third characteristic frequency f0_3 is measured. The measurement of f0_3 is performed using a known voltage level of the voltage AS, such that the impedance can be calculated using the measured current is. This allows the estimation of a power level at the frequency f0_3 with a duty cycle of 50% when driving the inverter 102 with mains voltage level for US. In a next step, the control unit 116 can calculate an appropriate duty cycle for some required power level.

High currents indicate a low impedance at the third characteristic frequency f0_3. Above a predetermined current threshold, power transfer is not started at the characteristic frequency f0_3. Instead a start frequency equal to or higher than the higher resonance frequency f1 is used to avoid high losses on the switching elements 109, 110 due to low duty cycle operation with very high switching currents.

The invention claimed is:

1. A method of operating an apparatus (100) for wirelessly transmitting electrical power in the direction of an electrical consumer (200) by means of inductive coupling, wherein the apparatus (100) comprises:
   a rectifier (108) for generating a DC Voltage ($U_S$) based on an alternating mains voltage ($U_N$),
   an inverter (102) being supplied by the DC voltage ($U_S$), the inverter (102) being adapted to generate a pulse width modulated control signal ($A_S$), and
   a transmitter coil (101) being supplied with the pulse width modulated control signal ($A_S$),
   wherein the transmitter coil (101) is adapted to generate an alternating magnetic field being used to wirelessly transmit the electrical power in the direction of the electrical consumer (200),
the method comprising the steps:
   determining a first characteristic frequency $f_{0\_1}$ of an oscillating circuit (103) comprising the transmitter coil (101), while the electrical consumer (200) is not inductively coupled to the transmitter coil (101),
   determining a second characteristic frequency $f_{0\_2}$ of the oscillating circuit (103) comprising the transmitter coil (101), while the electrical consumer (200) is inductively coupled to the transmitter coil (101) and an electrical load (204) of the electrical consumer (200) is deactivated, and
   operating the apparatus (100) depending on a frequency difference $\Delta f_c = f_{0\_1} - f_{0\_2}$.

2. The method according to claim 1, characterized by the steps
   determining a third characteristic frequency $f_{0\_3}$ of the oscillating circuit (103) comprising the transmitter coil (101), while the electrical consumer (200) is inductively coupled to the transmitter coil (101) and the electrical load (204) of the electrical consumer (200) is activated, and
   operating the apparatus (100) depending on a frequency $f_{calc} = f_{0\_3} + \Delta f_c$.

3. The method according to claim 2, characterized by the step
   estimating a characteristic of a transfer function P(f) depending on the frequency $f_{calc}$ and depending on design parameters of the electrical consumer (200), wherein the transfer function P(f) specifies an electrical power transmittable by the apparatus (100) depending on an operating frequency, and the design parameters of the electrical consumer (200) specify electrical and/or mechanical properties of the electrical consumer (200).

4. The method according to claim 3, characterized in that the characteristic of the transfer function P(f) specifies if the transfer function P(f) has one peak or two peaks.

5. The method according to claim 3, characterized by the step
   setting a frequency (f) and/or a duty cycle of the pulse width modulated control signal ($A_S$) for the transmission of power depending on the characteristic of the transfer function P(f).

6. The method according to claim 5, characterized by the step
   determining an impedance at the third characteristic frequency $f_{0\_3}$, wherein the frequency (f) and/or the duty cycle of the pulse width modulated control signal ($A_S$) is set for the transmission of power depending on the impedance at the third characteristic frequency $f_{0\_3}$.

7. The method according to claim 6, characterized in that the frequency (f) of the pulse width modulated control signal ($A_S$) is set in a frequency range of the third characteristic frequency $f_{0\_3}$ or in a frequency range higher than a frequency of a second peak of the transfer function P(f) depending on the impedance at the third characteristic frequency $f_{0\_3}$.

8. The method according to claim 2, characterized in that at the first characteristic frequency $f_{0\_1}$, at the second characteristic frequency $f_{0\_2}$ and at the third characteristic frequency $f_{0\_3}$ a current ($i_S$) flowing in the oscillating circuit (103) is in phase with the pulse width modulated control signal ($A_S$).

9. The method according to claim 2, characterized in that at the first characteristic frequency $f_{0\_1}$, at the second characteristic frequency $f_{0\_2}$ and at the third characteristic frequency $f_{0\_3}$ a current ($i_S$) flowing in the oscillating circuit (103) has its maximum value.

10. The method according to claim 1, characterized by the step
    applying a stimulus signal having a predetermined frequency spectrum to the oscillating circuit (103), wherein at the first characteristic frequency $f_{0\_1}$, at the second characteristic frequency $f_{0\_2}$ and at a third characteristic frequency $f_{0\_3}$ a frequency spectrum of a current ($i_s$) flowing in the oscillating circuit (103) caused by the stimulus signal has its maximum value.

11. The method according to claim 2, characterized in that the step of determining the first characteristic frequency $f_{0\_1}$, the step of determining the second characteristic frequency $f_{0\_2}$ and the step of determining the third characteristic frequency $f_{0\_3}$ is performed while a level of the DC Voltage ($U_S$) is below 120 V, in particular below 30 V.

12. A system (1000), comprising:
    an apparatus (100) for wirelessly transmitting electrical power in the direction of an electrical consumer (200) by means of inductive coupling, the apparatus (100) comprising:
    a rectifier (108) for generating a DC Voltage ($U_S$) based on an alternating mains voltage ($U_N$),
    an inverter (102) being supplied by the DC voltage ($U_S$), the inverter (102) being adapted to generate a pulse width modulated control signal ($A_S$), and a transmitter coil (101) being supplied with the pulse width modulated control signal ($A_S$), wherein the transmitter coil (101) is adapted to generate an alternating magnetic field being used to wirelessly transmit the electrical power in the direction of the electrical consumer (200), and the electrical consumer (200), wherein the apparatus (100) and the electrical consumer (200) are adapted to perform a method as in any of the preceding claims.

* * * * *